(12) United States Patent
Hiraka et al.

(10) Patent No.: US 10,754,194 B2
(45) Date of Patent: Aug. 25, 2020

(54) LUMINOUS FLUX CONTROL MEMBER, LIGHT-EMITTING DEVICE, AND METHOD FOR PRODUCING LIGHT-EMITTING DEVICE

(71) Applicant: ENPLAS CORPORATION, Kawaguchi-shi, Saitama (JP)

(72) Inventors: Kensuke Hiraka, Saitama (JP); Kakeru Nakamura, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 16/499,065

(22) PCT Filed: Mar. 27, 2018

(86) PCT No.: PCT/JP2018/012554
§ 371 (c)(1),
(2) Date: Sep. 27, 2019

(87) PCT Pub. No.: WO2018/181387
PCT Pub. Date: Oct. 4, 2018

(65) Prior Publication Data
US 2020/0041843 A1 Feb. 6, 2020

(30) Foreign Application Priority Data

Mar. 28, 2017 (JP) ................. 2017-063376

(51) Int. Cl.
*F21V 17/06* (2006.01)
*G02F 1/13357* (2006.01)
*F21V 5/00* (2018.01)

(52) U.S. Cl.
CPC .......... *G02F 1/133606* (2013.01); *F21V 5/00* (2013.01); *G02F 1/133603* (2013.01);
(Continued)

(58) Field of Classification Search
CPC .... F21V 5/00; F21V 5/04–048; F21V 17/005; F21V 17/10–20; G02B 3/00; G02F 1/1336–133611
(Continued)

(56) References Cited

U.S. PATENT DOCUMENTS

2009/0109687 A1   4/2009 Householder et al.
2014/0313731 A1  10/2014 Kwak et al.
(Continued)

FOREIGN PATENT DOCUMENTS

CN    201034294 Y    3/2008
CN    202972727 U    6/2013
(Continued)

OTHER PUBLICATIONS

International Search Report and Written Opinion issued in International Application No. PCT/JP2018/012554, dated Jun. 19, 2018, 12 pages with an English translation of the ISR.
(Continued)

*Primary Examiner* — Jason M Han
(74) *Attorney, Agent, or Firm* — Hamre, Schumann, Mueller & Larson, P.C.

(57) ABSTRACT

The present invention provides a lens (i.e., luminous flux control member) for an optical element of a backlight, capable of easily aligning the orientation in the plane direction. The luminous flux control member according to the present invention includes a lens main body and legs. The lens main body includes a light-entering area for light emitted from a light-emitting element to enter on the lower surface side and a light-emitting area for emitting the light entered from the light-entering area to the outside on the upper surface side. The legs are legs for mounting the luminous flux control member on a substrate on which the light-emitting element is mounted and are disposed on the
(Continued)

lower surface of the lens main body so as to project downward. The luminous flux control member satisfies the following condition 1 or 2:

(Condition 1) at least one of the legs is accommodated in one of two grooves having different widths, and all of the other legs are accommodated in the other groove only when the lens main body is oriented in one predetermined direction or an opposite direction thereto; and (Condition 2) the lens main body or all of the legs are accommodated in one groove only when the lens main body is oriented in one predetermined direction or an opposite direction thereto.

17 Claims, 15 Drawing Sheets

(52) U.S. Cl.
CPC ............... *G02F 1/133611* (2013.01); *G02F 2001/133607* (2013.01)

(58) Field of Classification Search
USPC .................................. 362/311.02, 433, 457
See application file for complete search history.

(56) References Cited

U.S. PATENT DOCUMENTS

| | | |
|---|---|---|
| 2015/0055350 A1 | 2/2015 | Suzuki et al. |
| 2015/0138759 A1 | 5/2015 | Nameda et al. |
| 2015/0338037 A1 | 11/2015 | Wang et al. |

FOREIGN PATENT DOCUMENTS

| | | |
|---|---|---|
| CN | 105299524 | 2/2016 |
| CN | 205480509 U | 8/2016 |
| JP | 2009-049239 | 3/2009 |
| JP | 2013-242499 | 12/2013 |
| JP | 2014-216322 | 11/2014 |
| JP | 2015-041437 | 3/2015 |
| WO | 2014/050602 | 4/2014 |

OTHER PUBLICATIONS

Office Action issued in the corresponding Chinese Patent Application No. 201880022333.0, dated Apr. 24, 2020, 16 pages with translation.

LUMINOUS FLUX CONTROL MEMBER, LIGHT-EMITTING DEVICE, AND METHOD FOR PRODUCING LIGHT-EMITTING DEVICE

TECHNICAL FIELD

The present invention relates to a luminous flux control member that is a lens for controlling the distribution of light emitted from a light-emitting element typified by an LED, a light-emitting device, and a method for producing the light-emitting device.

BACKGROUND ART

A display such as a liquid crystal display includes a backlight, which is a surface light source device for irradiating a display panel with light. The backlight includes: for example, an LED substrate on which LEDs are mounted as a light-emitting element; and a lens for diffusing light emitted from the LED. The LED substrate is generally strip-shaped, and LEDs are mounted at predetermined intervals in the longitudinal direction. Further, the lens is mounted on the LED substrate so as to cover the LEDs. The lens includes, for example, a light-entering area for light emitted from the LEDs to enter on the lower surface side, a light-emitting area for emitting the light entered from the light-entering area to the outside on the upper surface side, and projecting legs for mounting the lens on the substrate on the lower surface side. The lens is mounted on the LED substrate by bonding with an adhesive or the like at the end of the leg (Patent Literature 1).

CITATION LIST

Patent Literature

Patent Literature 1: JP 2015-41437 A

SUMMARY OF INVENTION

Technical Problem

In the lens, for example, the light-entering area and the light-emitting area are formed to be rotationally symmetric (circularly symmetric, two-fold symmetric, four-fold symmetric, or the like), and the rotation axis coincides with the central axis of the lens. Moreover, for example, from the viewpoint of the type and purpose of the LED substrate, it may be desirable that the lens aligns orientation in the rotation direction on the central axis of the lens as the rotation axis to be desirable in the LED substrate. However, as mentioned above, the light-entering area and the light-emitting area of the lens are generally rotationally symmetric. Thus, there is a problem in that it is difficult to align the orientation of the lens in the rotation direction to be desirable with respect to the longitudinal direction of the LED substrate, for example.

Hence, the present invention is intended to provide a lens (i.e., luminous flux control member) for a light-emitting element of a backlight, capable of easily aligning the orientation in the rotation direction, for example.

Solution to Problem

In order to achieve the aforementioned object, the present invention provides a luminous flux control member including: a lens main body; and legs, wherein the lens main body includes: a light-entering area for light emitted from a light-emitting element to enter on a lower surface side; and a light-emitting area for emitting the light entered from the light-entering area on an upper surface side, and the legs are legs for mounting the luminous flux control member on a substrate on which the light-emitting element is mounted and are disposed on a lower surface of the lens main body so as to project downward, and the luminous flux control member satisfies the following condition 1 or 2:

(Condition 1) at least one of the legs is accommodated in one of two grooves having different widths, and all of the other legs are accommodated in the other groove only when the lens main body is oriented in one predetermined direction or an opposite direction thereto; and (Condition 2) the lens main body or all of the legs are accommodated in one groove only when the lens main body is oriented in one predetermined direction or an opposite direction thereto.

The present invention further provides a light emitting device, including: a substrate; at least one light-emitting element; and a luminous flux control member, wherein the at least one light-emitting element includes light-emitting elements, the light-emitting elements are mounted on the substrate, the luminous flux control member is mounted so at to cover the light-emitting elements, and the luminous flux control member is the luminous flux control member according to the present invention.

The present invention further provides a method for producing a light-emitting device, including: an aligning step of aligning orientation of luminous flux control members by passing through at least one rail having a groove; and a mounting step of moving the luminous flux control members aligned by passing through the at least one rail on a light-emitting element-mounted substrate while maintaining the aligned orientation so as to cover the light-emitting element, wherein the luminous flux control members are the luminous flux control members according to the present invention, and the aligning step satisfies the following condition 1' or 2':

(Condition 1') the at least one rail includes two rails, grooves of the two rails have different widths, and at least one of the legs is accommodated in one of the grooves, and the other legs are accommodated in the other groove only when lens main bodies of the luminous flux control members are oriented in predetermined one direction or the opposite direction; and (Condition 2') the at least one rail includes one rail, the lens main body or all of the legs are accommodated in the groove only when lens main bodies of the luminous flux control members are oriented in predetermined one direction or the opposite direction.

Advantageous Effects of Invention

The luminous flux control member according to the present invention satisfies the condition 1 or 2. Thus, for example, the orientation of the luminous flux control member in the rotation direction can be controlled to be a predetermined direction by simply causing the luminous flux control member to pass through a rail(s) corresponding to a groove(s). Therefore, for example, in the production of the light-emitting device that is a component of a backlight, the luminous flux control member can be mounted on an LED substrate in the state where the luminous flux control member is oriented in a predetermined direction.

DESCRIPTION OF EMBODIMENTS

Figure 1A:
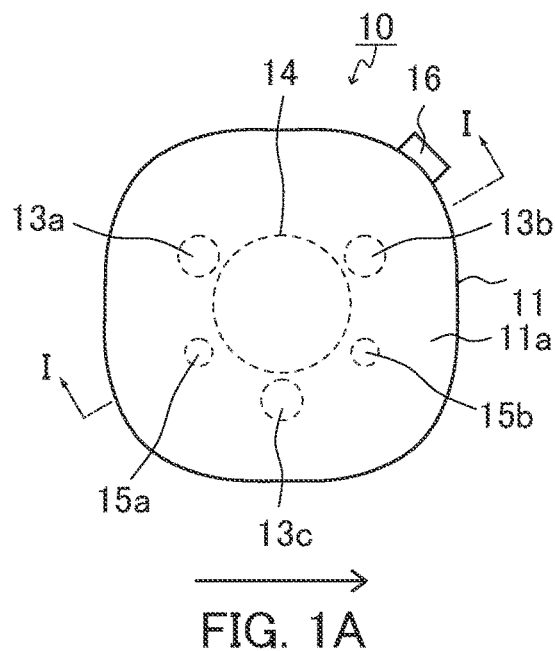
FIG. 1A is a top view of a luminous flux control member 10 according to an embodiment 1A.

For example, in the luminous flux control member according to the present invention, the number of the legs is three or more.

For example, the luminous flux control member according to the present invention, further includes: at least one downward projection projecting downwardly, the at least one downward projection is disposed on a lower surface side of the lens main body, and the luminous flux control member satisfies the condition 1.

For example, in the luminous flux control member according to the present invention, the legs are disposed at equal intervals on the same circumference of a circle centered on the center of a lower surface side of the lens main body, and the at least one downward projection is disposed on the same circumference.

For example, in the luminous flux control member according to the present invention, the number of the legs is three, the at least one downward projection includes two downward projections, and one of the downward projections is disposed between adjacent legs.

For example, in the luminous flux control member according to the present invention, at least one of the legs has an elliptical cross section (hereinafter also referred to as an "elliptical leg"), the other legs have a circular cross section (hereinafter also referred to as "circular legs"), and the luminous flux control member satisfies the condition 1.

For example, in the luminous flux control member according to the present invention, the legs are disposed at equal intervals on the same circumference of a circle centered on the center of the lower surface side of the lens main body.

For example, in the luminous flux control member according to the present invention, the number of the elliptical legs is two, the number of the circular legs is one, each of the two elliptical legs has a diameter in the lateral direction that is the same as that of the circular leg, and the longitudinal sides of the elliptical legs are parallel to each other.

For example, in the luminous flux control member according to the present invention, the number of the legs is three, and the legs are disposed to be vertices of an isosceles triangle on the lower surface side of the lens main body, and the luminous flux control member satisfies the condition 2.

For example, the luminous flux control member according to the present invention further includes at least one radial projection projecting outward in a radial direction, the at least one radial projection is disposed outward from a side surface of the lens main body, and the luminous flux control member satisfies the condition 2.

For example, in the luminous flux control member according to the present invention, the at least one radial projection includes a pair of radial projections, one of the radial projections is disposed at any site on a side surface of the lens main body, and the other radial projection is disposed at a site on the side surface opposite across the center line of the lens main body from the any site.

The luminous flux control member according to the present invention is a lens that allows light emitted from an optical element mounted on a substrate to enter and emits the light to the outside and is used in, for example, backlights. Thus, the luminous flux control member according to the present invention can also be referred to as a lens for an optical element of a backlight, for example. The light-emitting element is not particularly limited and can be, for example, an LED.

In the luminous flux control member according to the present invention, the diffuseness of the light is not at all limited. In the case where the kind of the diffuseness of the light is anisotropic diffusion, the luminous flux control member according to the present invention can be used when the direction of the diffusion is aligned or the like. Moreover, for example, a gate for injecting a resin at the time of molding a luminous flux control member is formed on a side surface of the luminous flux control member. In the case where the kind of the diffuseness of the light is isotropic diffusion, the position of the gate may be recognized as a bright section on the emission surface of the backlight, and it is necessary to dispose the luminous flux control member in a fixed orientation by using a peripheral member in order to cope with the bright section. In such a case, the luminous flux control member according to the present invention can be used to align the orientation of the gate.

Examples of the luminous flux control member according to the present invention include a first luminous flux control member satisfying the condition 1, and the second luminous flux control member satisfying the condition 2. Embodiments of the luminous flux control member according to the present invention will be described below. Unless otherwise indicated, each embodiment can be described with reference to the descriptions of the other embodiments. In the following embodiments, an LED is shown as an example of the light-emitting element on which the luminous flux control member according to the present invention is mounted. The present invention, however, is not limited to this example and can be applied to light-emitting elements other than the LED.

The embodiments of the first luminous flux control member according to the present invention will be described below with reference to the drawings. It is to be noted, however, that the present invention is by no means limited or restricted by the following embodiments. In the respective drawings, the same components/portions are given the same reference numerals. In the drawings, the structure of each component/portion may be shown in a simplified form as appropriate for convenience of illustration, and the dimension ratio and the like of each component/portion are not limited to the conditions shown in the drawings. Embodiments 1A and 1B show specific examples of a tetra-symmetrical anisotropic lens, and Embodiments 1C and 1D show specific examples of a di-symmetrical anisotropic lens. However, in the present invention, the kind of diffuseness is not at all limited, and the lens may be isotropic or anisotropic, and various kinds of lens can be used.

Embodiment 1A

Figure 1B:
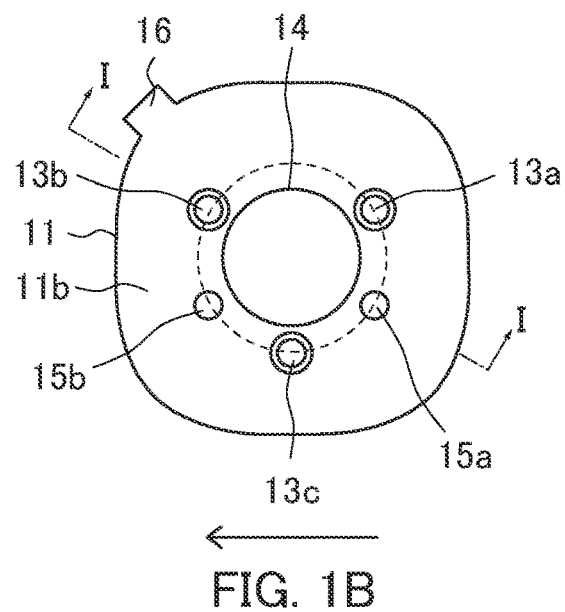
FIG. 1B is a bottom view of the luminous flux control member 10.
Figure 1C:
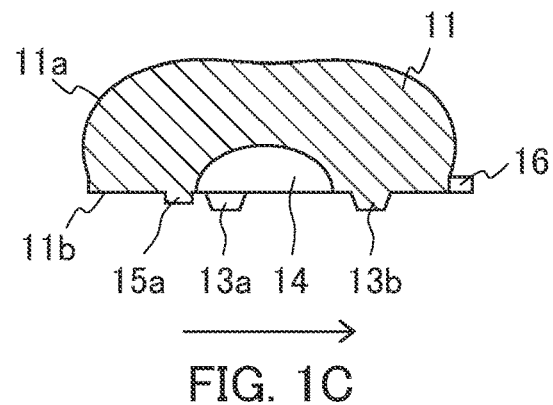
FIG. 1C is a cross-sectional view of the luminous flux control member 10 viewed from the I-I direction of FIGS. 1A and 1B.

FIGS. 1A to 1C show an example of a first luminous flux control member. FIG. 1A is a plan view of the luminous flux control member 10 viewed from above. FIG. 1B is a plan view of the luminous flux control member 10 viewed from below. FIG. 1C is a cross-sectional view of the luminous flux control member 10 viewed from the I-I direction of FIGS. 1A and 1B. Note here that the arrow at the bottom of each figure is drawn for convenience in order to indicate the same direction in the plan view viewed from above, the plan view viewed from below, and the cross-sectional view (hereinafter the same).

The luminous flux control member 10 according to the present embodiment includes a lens main body 11, legs 13 (13*a*, 13*b*, 13*c*), and downward projections 15 (15*a*, 15*b*). The lens main body 11 includes a light-entering area for light emitted from the light-emitting element on the lower surface 11*b* side, includes a light-emitting area for emitting the light entered from the light-entering area to the outside on the upper surface 11*a* side, and serves as a mounting side on the LED substrate. On the lower surface 11*b* side, the lens main body 11 includes a depression 14 for covering the LED on the LED substrate at the center, and legs 13*a*, 13*b*, and 13*c* are disposed around the depression 14. On the lower surface 11*b* side of the lens main body 11, the downward projections 15*a* and 15*b* are disposed between the legs 13*a* and 13*c* and between the legs 13*b* and 13*c*, respectively. As shown in FIGS. 1A to 1C, a gate 16 may remain on the side surface side of the luminous flux control member 10, for example. The gate 16 is a projection remaining on the side surface of each luminous flux control member 10 cut out from a molded body of continuous luminous flux control members 10 obtained by integrally molding the luminous flux control members 10. For example, the luminous flux control member 10 may or may not include the gate 16. When the luminous flux control member 10 includes a gate 16, it can be used as a sign for visually checking the orientation in the rotation direction, for example.

The lens main body 11 is only required to diffuse light, and the type thereof is not particularly limited. The lens main body 11 may be, for example, an isotropic lens or an anisotropic lens. When the anisotropic lens is mounted on an LED substrate, it is preferable to align the rotation direction in view of the nature of the anisotropic lens. The present invention can easily align the rotation direction of the lens as mentioned above. The present invention is thus particularly useful when the lens main body 11 is an anisotropic lens.

The shape and size of the lens main body 11 are not particularly limited. The shape of the lens main body 11 can be, for example, circular, angular, or the like. The circular shape can be, for example, a circle, a perfect circle, an ellipse, or the like. The angular shape may be, for example, a square, a rectangle, a polygon, or the like, and the corner may be rounded, for example. The size of the lens main body 11 is not particularly limited, and in the case of a circular shape, for example, the diameter passing through the center is 10 to 20 mm, and in the case of an angular shape, for example, the length passing through the center is 10 to 15 mm.

The material of the lens main body 11 is not particularly limited and can be, for example, a material that transmits light. Examples of the material include glass and a transparent resin, and examples of the transparent resin include polymethyl methacrylate (PMMA), polycarbonate (PC), an epoxy resin (EP), and a silicone resin. The legs 13 and the downward projections 15 can be integrally molded with the lens main body 11, for example. Thus, the materials of the legs 13 and the downward projections 15 are the same as that of the lens main body 11, for example.

The depression 14 on the lower surface 11*b* side of the lens main body 11 becomes, for example, a region covering the LED at the time of mounting on the LED substrate as mentioned above, and light emitted from the LED mainly enters the lens main body 11 from the inner surface of the depression 14. The size of the depression 14 is not particularly limited and can be determined appropriately according to the size of the LED in the LED substrate, for example.

The legs 13*a*, 13*b*, and 13*c* are disposed on the same circumference of a circle centered on, for example, the center of the lower surface 11*b* of the lens main body 11, and specifically, the legs 13 are disposed such that the axial center of each leg 13 is positioned on the same circumference of a circle. The legs 13*a*, 13*b*, and 13*c* are disposed at equal intervals on the same circumference of a circle, for example, and may also be said to be disposed at the same angle (for example, 120°), with respect to the center of the lower surface 11*b* of the lens main body 11. By disposing the legs in such a well-balanced manner, more stable moldability can be obtained, for example.

The shape and size of each leg 13 are not particularly limited. The shape of each leg 13 can be, for example, cylindrical, prismatic, or the like. For example, the horizontal cross section of each leg 13 may have the same size, or the vertical cross section of each leg 13 has a shape that narrows from the top to the bottom.

Each leg 13 is mounted on the LED substrate by an adhesive or the like at the downward end. Thus, it is preferable that the downward end of each leg 13 has a relatively small area, for example. This makes it possible to further prevent the influence of, for example, the adhesive or the like on the optical characteristics of the LED substrate on which the luminous flux control member according to the present invention is mounted.

In the present embodiment, the number of legs 13 is three (13a, 13b, and 13c) but is not limited thereto. The number of legs 13 is not particularly limited and is, for example, three or more. In the case where the three legs are bonded to the substrate, for example, the inclination at the time of mounting the lens main body 11 to the substrate can be sufficiently prevented even if each leg has a small bonding area to the substrate.

The downward projections 15a and 15b are disposed, for example, on the same circumference of a circle on which the legs 13 are disposed, and specifically, the axial centers of the downward projections 15 are arranged on the same circumference of a circle. The downward projection 15a is disposed between the legs 13a and 13c and between the legs 13b and 13c, respectively. The downward projections 15a and 15b are disposed to be, for example, equidistant from the legs 13a and 13c, and the downward projection 15b is disposed to be, for example, equidistant from the legs 13b and 13c.

The relationship between the size of each leg 13 and the size of each downward projection 15 is not particularly limited. When the luminous flux control member 10 is molded in a mold, marks of projecting pins formed when the luminous flux control member 10 molded in a cavity of the mold is projected from the cavity of the mold by the projecting pins can be used as the downward projections 15, for example. In this case, it is preferable that the dimension of each downward projection 15 is, for example, a diameter dimension sufficient as a projecting pin.

The relationship between the length of each leg 13 and the length of each downward projection 15 is not particularly limited. The luminous flux control member 10 is mounted on the substrate by the legs 13. Thus, for example, when each leg 13 is bonded to the substrate, each downward projection 15 has a length that does not interfere with the substrate. Further, as mentioned above, the luminous flux control member 10 according to the present embodiment satisfies the condition 1. Thus, the lengths of each leg 13 and each downward projection 15 are set to be lengths with which they can be inserted into two grooves under the condition 1, and the lens main body 11 can be fixed on the substrate at a height at which light emitted from the LED can appropriately enter the lens main body 11, for example.

Figure 2A:
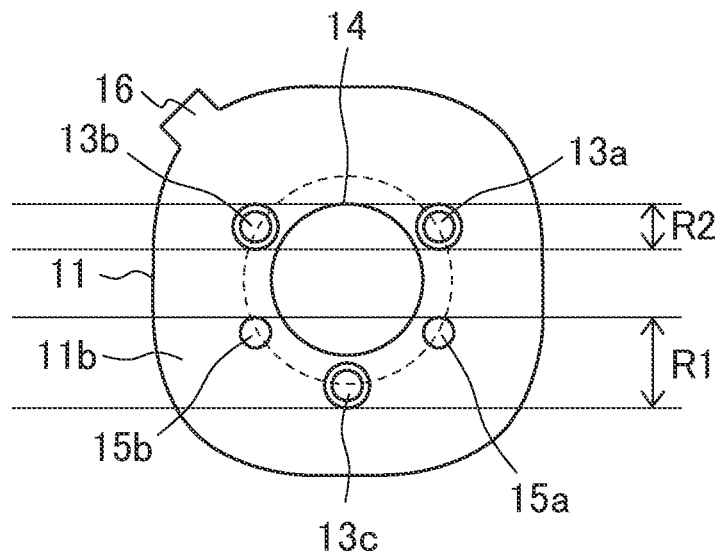
FIGS. 2A and 2B are schematic views showing a relationship between the luminous flux control member 10 and grooves in the embodiment 1A.
Figure 2B:
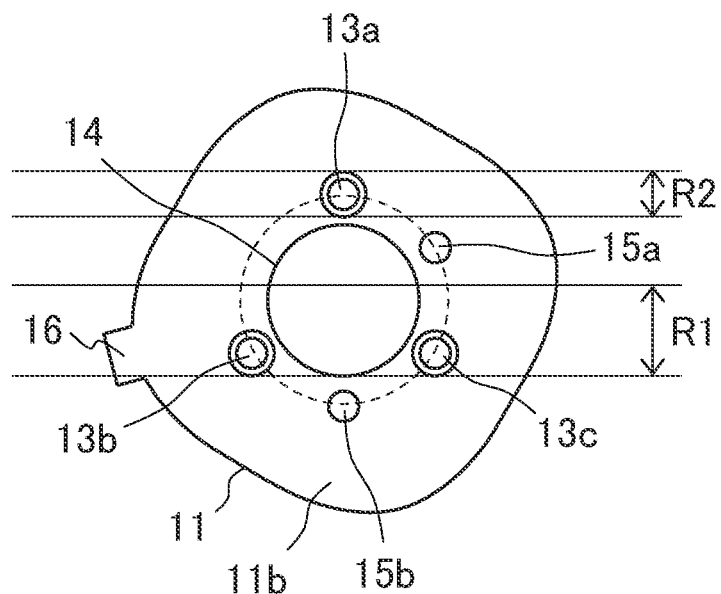

Next, FIGS. 2A and 2B schematically show the relationship between the luminous flux control member 10 and two grooves having different widths. FIGS. 2A and 2B are plan views of the luminous flux control member 10 viewed from below as in FIG. 1B.

As shown in FIG. 2A, the luminous flux control member 10 has downward projections 15a and 15b. Thus, all the legs 13 and all the downward projections 15 can be controlled to be accommodated in either one of two parallel grooves R1 and R2 having different widths only when the luminous flux control member 10 is oriented in a predetermined direction. Specifically, as shown in FIG. 2A, the luminous flux control member 10 is designed such that the downward projection 15b, the leg 13c, and the downward projection 15a are accommodated in the groove R1 having a relatively large width among the two grooves R1 and R2 having different widths, and the legs 13a and 13b are accommodated in the groove R2 having a relatively small width. Thus, when a plurality of luminous flux control members 10 are to be passed through rails having the parallel grooves R1 and R2, the luminous flux control members 10 are oriented as shown in FIG. 2A and can pass through the rails. That is, by passing a plurality of luminous flux control member 10 thorough the rails, it becomes possible to align all of the orientations of the luminous flux control members 10.

The size and placement of the legs 13 and the downward projections 15 in the luminous flux control member 10 and the width of the grooves R1 and R2 in the rails can be set on the basis of any of them, for example. For example, by setting the size and placement of the former in advance, the width of the latter can be set, or by setting the width of the latter in advance, the size and placement of the former can be set.

The groove R2 accommodates the legs 13a and 13b. Thus, the width of the groove R2 can be set according to the diameters of the legs 13a and 13b, for example. The width (r2) of the groove R2 is, for example, smaller than the width (r1) of the groove R1 and is set such that the groove R2 can accommodate legs 13a and 13b each having the maximum length and cannot accommodate the downward projection 15b, the leg 13c, and the downward projection 15c, considering the tolerances of the widths (r2) and (r1).

The groove R1 accommodates the downward projection 15b, the leg 13c, and the downward projection 15a. Thus, the width of the groove R1 can be set according to the diameter of the leg 13c, the diameters of the downward projections 15a and 15b, the distance between the former and the latter, and the like.

In the luminous flux control member 10 according to the present embodiment, if the orientation of the grooves R1 and R2 shown in FIG. 2A with respect to the axis changes, the legs 13 and the downward projections 15 of the luminous flux control member 10 do not fit in the grooves R1 and R2. For example, when the luminous flux control member 10 shown in FIG. 2A is rotated to be oriented as shown in FIG. 2B, the leg 13a is accommodated in the groove R2, but the other leg 13b, downward projection 15b, leg 13c, and downward projection 15a cannot be accommodated in the groove R1. As shown in FIG. 2A, the width of the groove R1 is determined based on the side surface of the leg 13c and the side surfaces of the downward projections 15a and 15b. Thus, as shown in FIG. 2A, the width between the straight line along the side surfaces of the downward projections 15a and 15b and the straight line along the side surface of the leg 13c is within the groove R1, but when the luminous flux control member 10 is rotated as shown in FIG. 2B, the legs 13 are fit in the grooves R1 and R2, and the downward projections 15a and 15b are not fit in the grooves R1 and R2. In this manner, the luminous flux control member 10 can pass through the two grooves R1 and R2 only when it is oriented in a predetermined direction.

Embodiment 1B

Figure 3A:
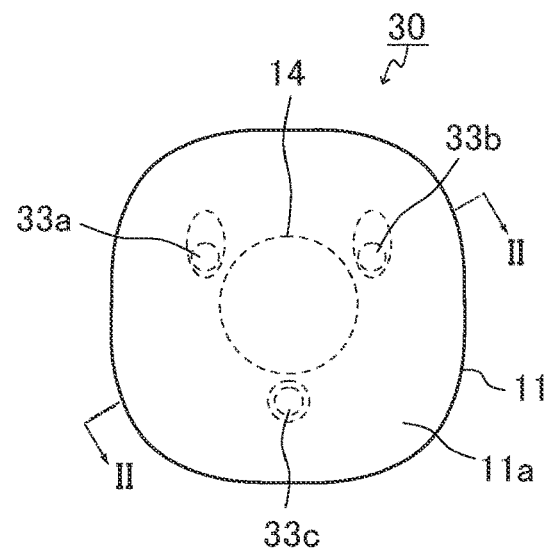
FIG. 3A is a top view of a luminous flux control member 30 according to an embodiment 1B.
Figure 3B:
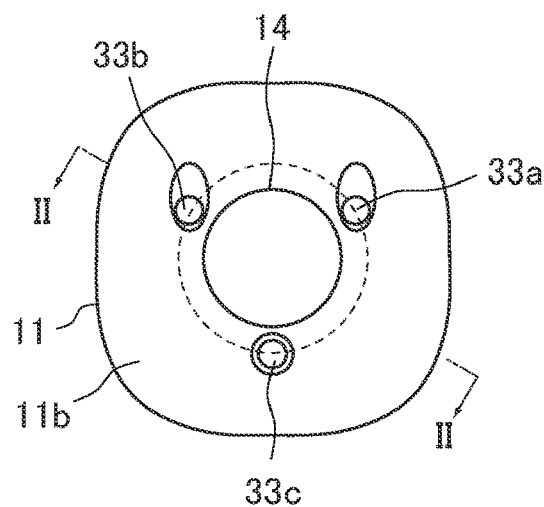
FIG. 3B is a bottom view of the luminous flux control member 30.
Figure 3C:
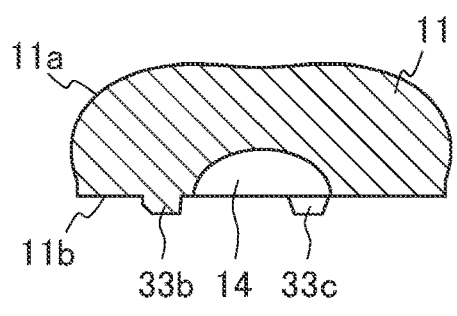
FIG. 3C is a cross-sectional view of the luminous flux control member 30 viewed from the II-II direction of FIGS. 3A and 3B.

FIGS. 3A to 3C show another example of the first luminous flux control member. FIG. 3A is a plan view of a luminous flux control member 30 viewed from above. FIG. 3B is a plan view of the luminous flux control member 30 viewed from below. FIG. 3C is a cross-sectional view of the luminous flux control member 30 viewed from the II-II direction.

The luminous flux control member 30 according to the present embodiment is the same as that of the embodiment 1A except that no downward projection 15 is present on the lower surface 11b side of the lens main body 11, and one of three legs 33 is a leg 33c having a circular cross section, and the other two legs are legs 33a and 33b having an elliptical cross section.

The size of each of the elliptical legs 33a and 33b is not particularly limited. The diameters of the elliptical legs 33a and 33b in the lateral direction are, for example, the same as that of the circular leg 33c.

The elliptical legs 33a and 33b are disposed on the lower surface 11b side of the lens main body 11 such that their longitudinal sides are parallel to each other. In this case, the longitudinal sides of the elliptical legs 33a and 33b may be oriented to lie on the same straight line, or as shown in FIGS. 3A and 3B, the longitudinal sides may be oriented to lie on two parallel straight lines.

Each of the elliptical legs 33a and 33b may have, for example, a circular end portion having the same diameter as the end of the circular leg 33c. In this case, the circular end portions of the elliptical legs 33a and 33b and the circular end potion of the circular leg 33c are disposed on the same circumference of a circle centered on the center of the lower surface 11b of the lens main body 11, for example. The circular ends of the elliptical legs 33a and 33b can be formed as marks of projecting pins in molding in the same manner as for the circular end of the circular leg 33c, for example.

As in the embodiment 1A, it is preferable that the areas of the downward ends of the elliptical legs 33a and 33b are relatively small. Therefore, it is preferable that the areas of the ends of the elliptical legs 33a and 33b are the same as that of the circular leg 33c, for example.

In the present embodiment, the number of legs 33 is three (33a, 33b and 33c) but is not limited thereto. The number of legs 33 is not particularly limited and is, for example, three or more. The number of elliptical legs among the legs 33 is not particularly limited and is, for example, two in the case where the number of the legs 33 is three.

Figure 4A:
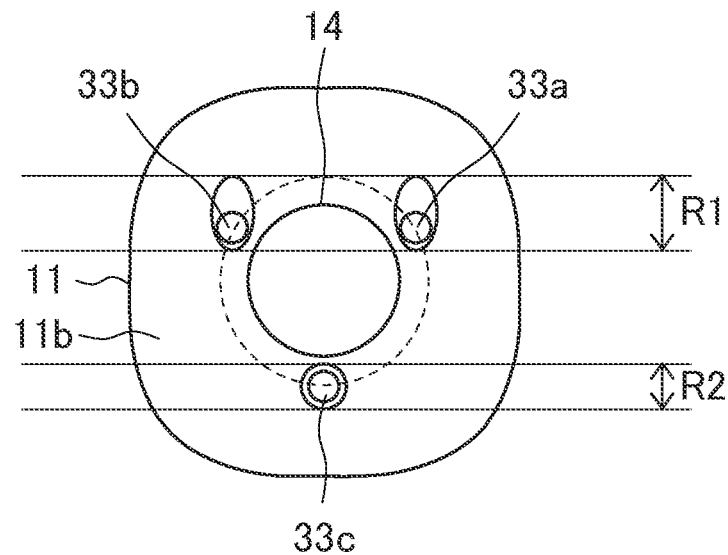
FIGS. 4A and 4B are schematic views showing a relationship between the luminous flux control member 30 and grooves in the embodiment 1B.
Figure 4B:
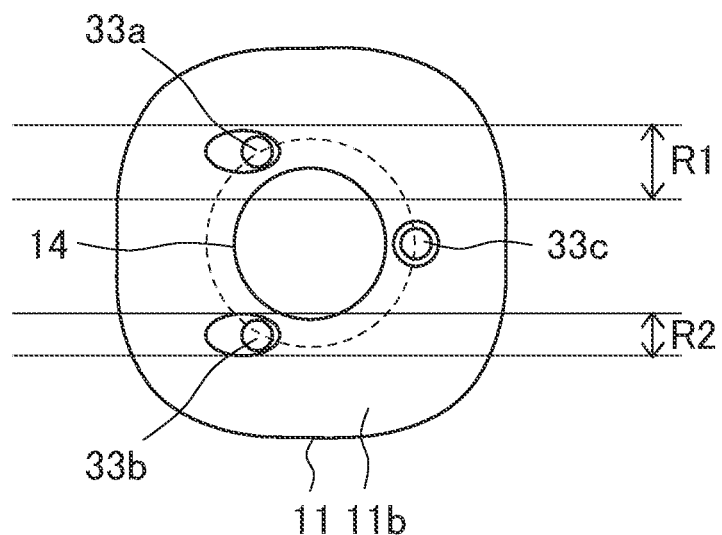

Next, FIGS. 4A and 4B schematically show the relationship between the luminous flux control member 30 and two grooves having different widths. FIGS. 4A and 4B are plan views of the luminous flux control member 30 viewed from below as in FIG. 3B.

As shown in FIG. 4A, when the luminous flux control member 30 has elliptical legs 33a and 33b, all of legs 33 can be controlled to be accommodated in either one of the grooves R1 and R2 which have different widths and are parallel to each other only in the case where the luminous flux control member 30 is oriented in a predetermined direction. Specifically, as shown in FIG. 4A, the luminous flux control member 30 is designed such that the elliptical legs 33b and 33a are accommodated in the groove R1 having a relatively large width between grooves R1 and R2 having different widths, and the circular leg 13c is accommodated in the groove R2 having a relatively small width. Thus, when a plurality of luminous flux control members 30 are to be passed through rails having the parallel grooves R1 and R2, the luminous flux control members 30 are oriented in a direction as shown in FIG. 4A and can pass through the rails. That is, by causing the luminous flux control members 30 to pass through the rails, the orientation of all of the luminous flux control members 30 can be aligned.

The sizes of the elliptical legs 33a and 33b and the circular leg 33c in the luminous flux control member 30 and the width of the grooves R1 and R2 in the rails can be set based on either of them, for example. For example, by setting the sizes and placement of the former in advance, the width of the latter can be set, or by setting the width of the latter in advance, the sizes and placement of the former can be set.

The groove R2 accommodates the circular leg 33c. Thus, the width of the groove R2 can be set according to the diameter of the circular leg 33c, for example. The width (r2) of the groove R2 is designed such that it is smaller than the width (r1) of the groove R1, and, in consideration of the tolerance therebetween, the groove R2 can accommodate the leg 33c having the maximum diameter, and it is narrower than the dimension of the elliptical legs 33a and 33b in the longitudinal direction, for example.

The groove R1 accommodates the elliptical legs 33a and 33b. Thus, the width of the groove R1 can be set according to the diameters of the elliptical legs 33a and 33b in the longitudinal direction.

In the luminous flux control member 30 according to the present embodiment, if the orientation of the grooves R1 and R2 shown in FIG. 4A with respect to the axis changes, the legs 33 of the luminous flux control member 30 are not fit in the grooves R1 and R2. For example, when the luminous flux control member 30 shown in FIG. 4A is rotated to be oriented in the direction as shown in FIG. 4B, the elliptical leg 33a is accommodated in the groove R1, the elliptical leg 33b is accommodated in the groove R2, and the circular leg 33c cannot be accommodated in any of the grooves R1 and R2. In this manner, the luminous flux control member 30 can pass through the grooves R1 and R2 only in a predetermined direction.

Embodiment 1C

Figure 9A:
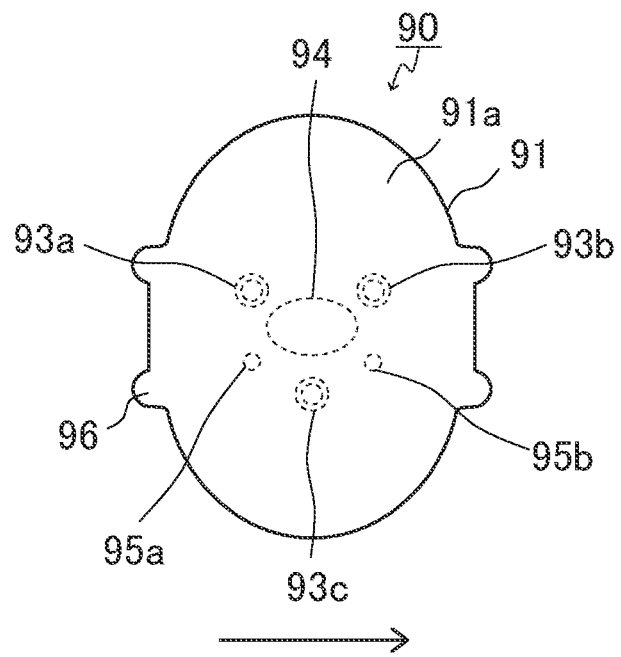
FIG. 9A is a top view of a luminous flux control member 90 according to an embodiment 1C.
Figure 9B:
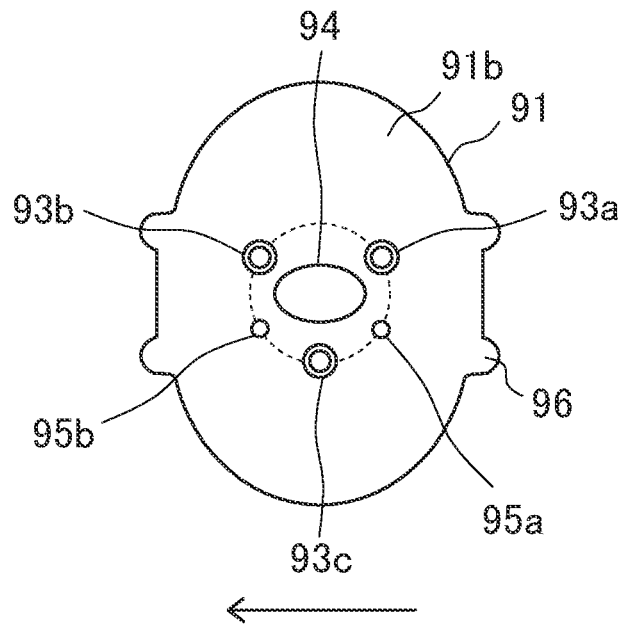
FIG. 9B is a bottom view of the luminous flux control member 90.

FIGS. 9A and 9B show yet another example of the first luminous flux control member. FIG. 9A is a plan view of the luminous flux control member 90 viewed from above. FIG. 9B is a plan view of the luminous flux control member 90 viewed from below. In FIGS. 9A and 9B, the legs 93 (93a, 93b, 93c) and the downward projections 95 (95a, 95b) have the same shape and placement as the legs 13 (13a, 13b, 13c) and the downward projections 15 (15a, 15b) as in FIGS. 1A to 1C, respectively.

The luminous flux control member 90 according to the present embodiment is the same as that of the embodiment 1A except that a lens main body 91 has an elliptic shape, a depression 94 for covering the LED on the lower surface 91b of the lens main body 91 has an elliptic shape, and side projections (i.e., projection projecting outward) 96 are present at four places. The side projections 96 may be formed to prevent damage to its optical surface at the time of handling the luminous flux control member 90 and to position the luminous flux control member 90 for fixing at the time of measuring its dimensions, for example.

Figure 10A:
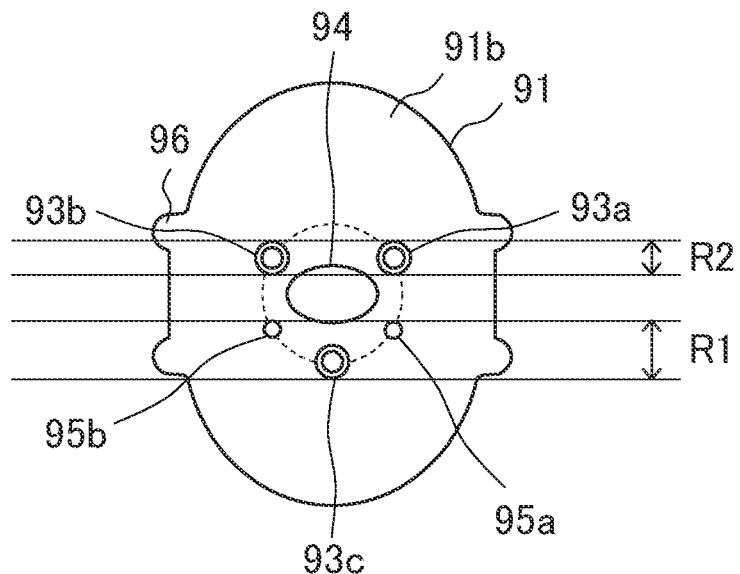
FIGS. 10A and 10B are schematic views showing a relationship between the luminous flux control member 90 and grooves in the embodiment 1C.
Figure 10B:
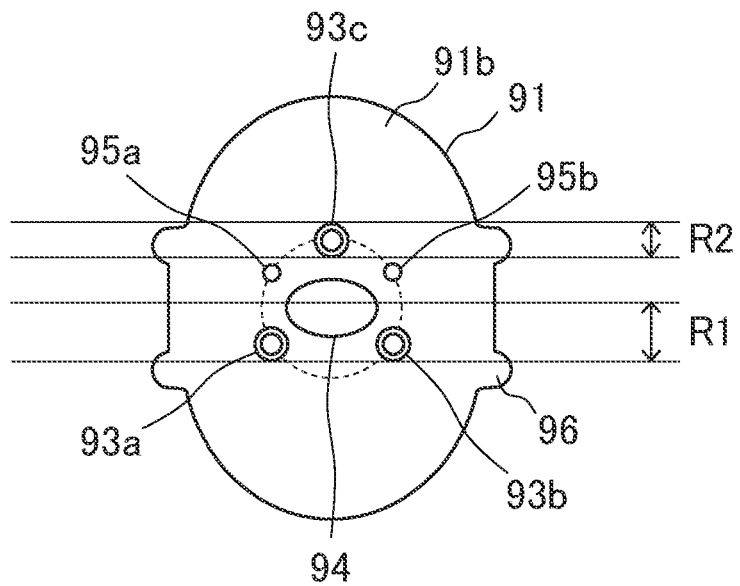

Next, FIGS. 10A and 10B schematically show the relationship between the luminous flux control member 90 and two grooves having different widths. FIGS. 10A and 10B are plan views of the luminous flux control member 90 viewed from below as in FIG. 9B. As shown in FIGS. 10A and 10B, the luminous flux control member 90 can pass through the two grooves R1 and R2 only in a predetermined direction as in the embodiment 1A.

Embodiment 1D

Figure 11A:
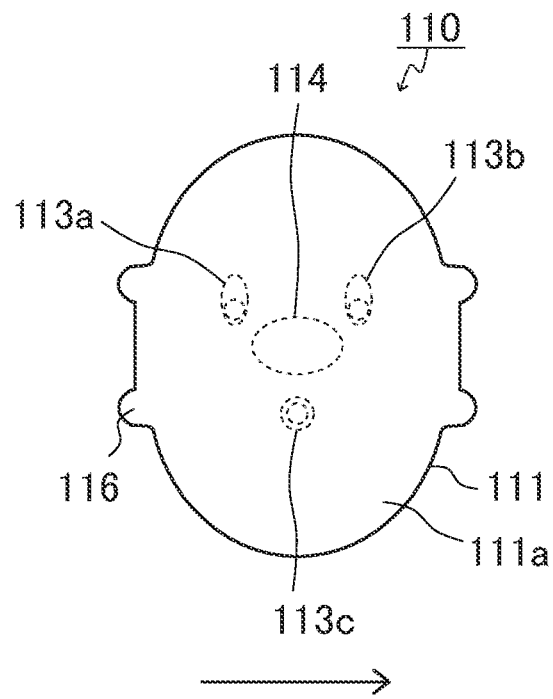
FIG. 11A is a top view of a luminous flux control member 110 according to an embodiment 1D.
Figure 11B:
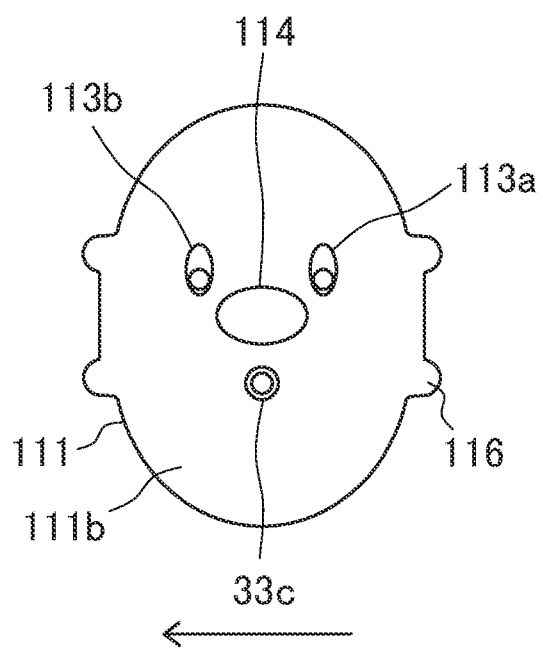
FIG. 11B is a bottom view of the luminous flux control member 110.

FIGS. 11A and 11B show yet another example of the first luminous flux control member. FIG. 11A is a plan view of a luminous flux control member 110 viewed from above. FIG. 11B is a plan view of the luminous flux control member 110 viewed from below. In FIGS. 11A and 11B, the legs 113 (113a, 113b, 113c) have the same shape and placement as the legs 33 (33a, 33b, 33c) in FIGS. 3A to 3C, respectively.

The luminous flux control member 110 according to the present embodiment is the same as that of the embodiment 1B except that a lens main body 111 has an elliptic shape, a depression 114 for covering the LED on the lower surface 111b of the lens main body 111 has an elliptic shape, and side projections 116 are present at four places.

Figure 12A:
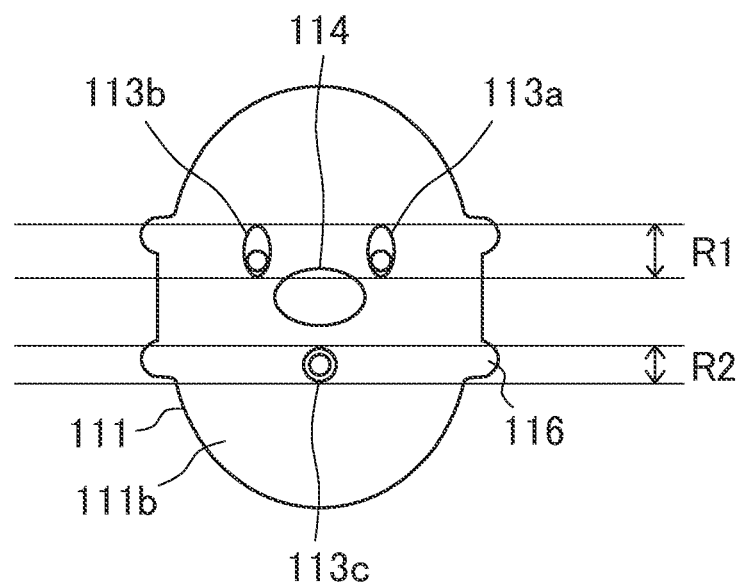
FIGS. 12A and 12B are schematic views showing a relationship between the luminous flux control member 110 and grooves in the embodiment 1D.
Figure 12B:
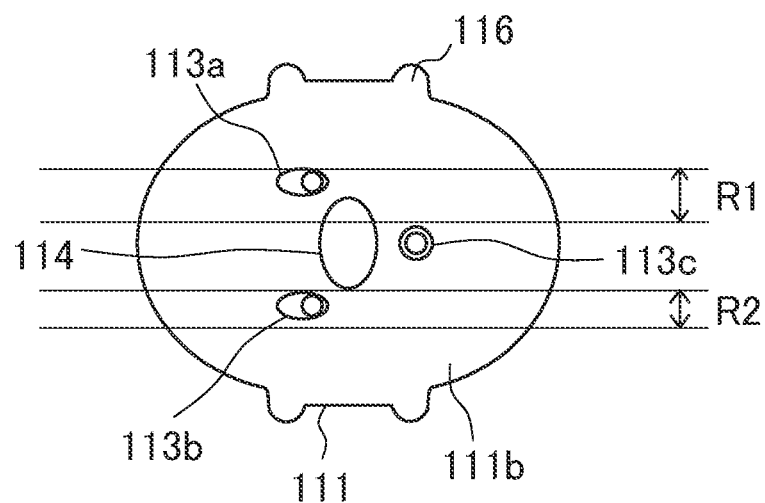

Next, FIGS. 12A and 12B schematically show the relationship between the luminous flux control member 110 and two grooves having different widths. FIGS. 12A and 12B are plan views of the luminous flux control member 110 viewed from below as in FIG. 11B. As shown in FIGS. 12A and 12B, the luminous flux control member 110 can pass through the two grooves R1 and R2 only in a predetermined direction as in the embodiment 1B.

The embodiments of the second luminous flux control member according to the present invention will be described below with reference to the drawings. It is to be noted, however, that the present invention is by no means limited or restricted by the following embodiments. In the respective drawings, the same components/portions are given the same reference numerals. In the drawings, the structure of each component/portion may be shown in a simplified form as appropriate for convenience of illustration, and the dimension ratio and the like of each component/portion are not limited to the conditions shown in the drawings.

Embodiment 2A

Figure 5A:
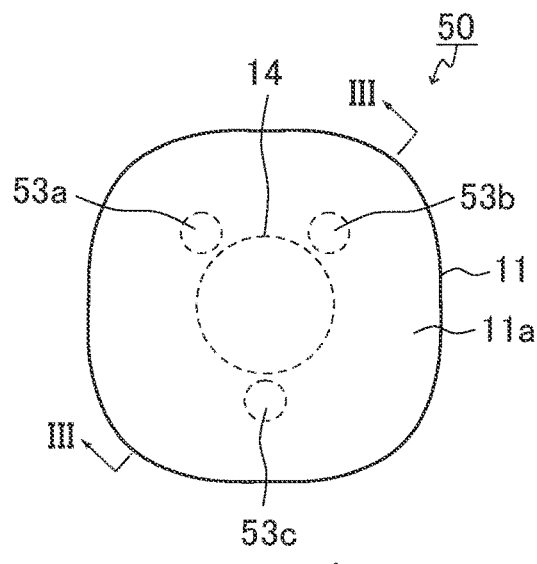
FIG. 5A is a top view of a luminous flux control member 50 according to an embodiment 2A.
Figure 5B:
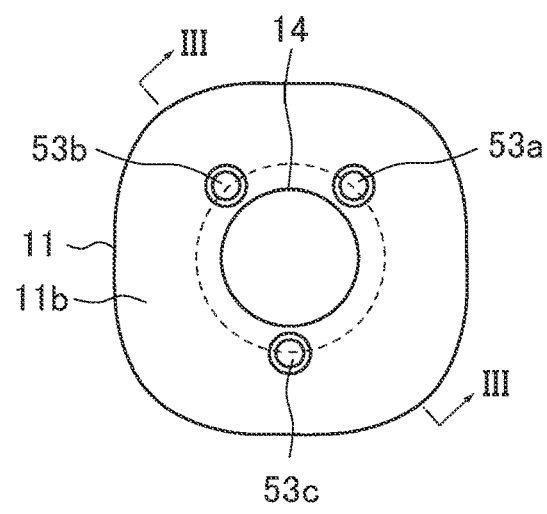
FIG. 5B is a bottom view of the luminous flux control member 50.
Figure 5C:
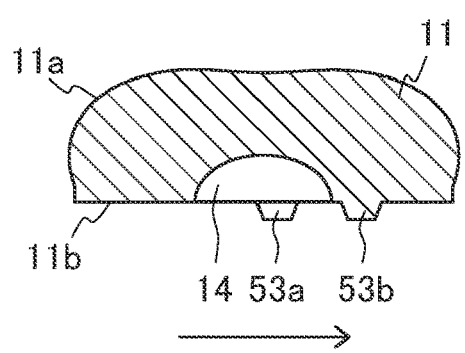
FIG. 5C is a cross-sectional view of the luminous flux control member 50 viewed from the III-III direction of FIGS. 5A and 5B.

FIGS. 5A to 5C show an example of the second luminous flux control member. FIG. 5A is a plan view of the luminous flux control member 50 viewed from above. FIG. 5B is a plan view of the luminous flux control member 50 viewed from below. FIG. 5C is a cross-sectional view of the luminous flux control member 50 viewed from the direction of FIGS. 5A and 5B.

The luminous flux control member 50 according to the present embodiment is the same as that of the embodiment 1A except that no downward projection 15 is present on the lower surface 11b side of the lens main body 11, and three legs 53 are disposed in an isosceles triangle.

Legs 53a, 53b, and 53c are disposed on the lower surface 11b side of the luminous flux control member 50 such that centers thereof form an isosceles triangle, and the center on the lower surface 11b side is the center of the isosceles triangle, for example. The size of the isosceles triangle is not particularly limited.

Figure 6A:
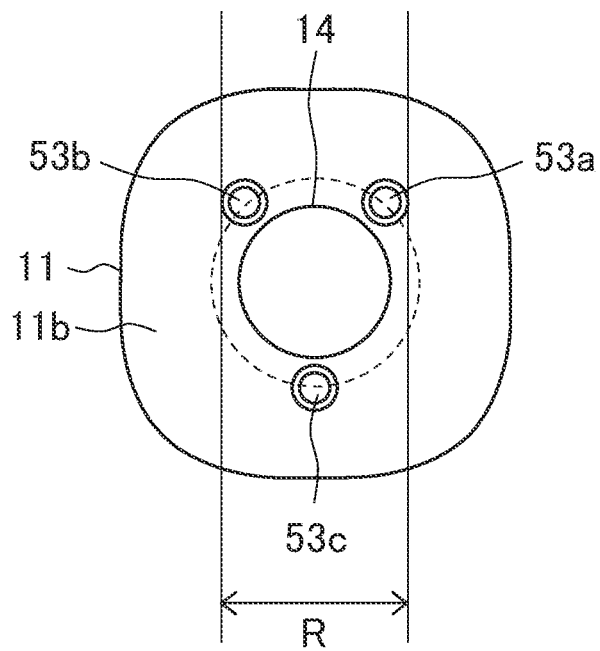
FIGS. 6A and 6B are schematic views showing a relationship between the luminous flux control member 50 and a groove in the embodiment 2A.
Figure 6B:
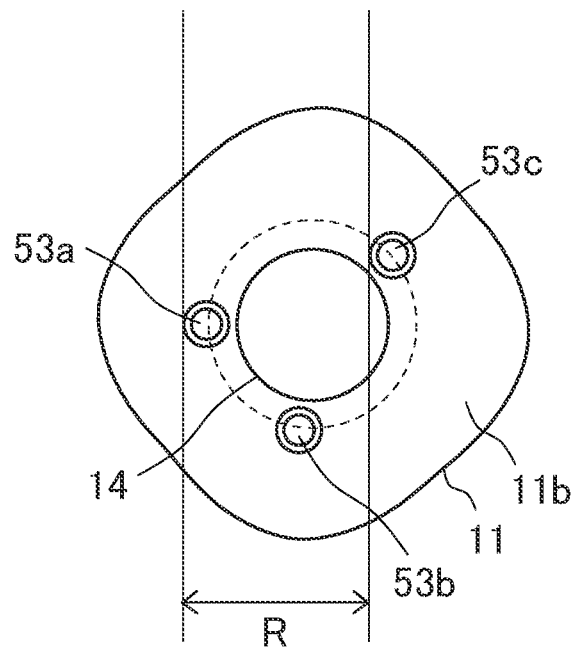

Next, FIGS. 6A and 6B schematically show the relationship between the luminous flux control member 50 and a groove. FIGS. 6A and 6B are plan views of the luminous flux control member 50 viewed from below as in FIG. 5B.

As shown in FIG. 6A, when the legs 53a, 53b, and 53c of the luminous flux control member 50 are disposed to form an isosceles triangle, all of the legs 53 can be controlled to be accommodated in one groove R only in the case where the luminous flux control member 50 is oriented in a predetermined direction. Specifically, as shown in FIG. 6A, the luminous flux control member 50 is designed such that all of the legs 53 are accommodated in the groove R in the state where the base of an isosceles triangle configured by the legs 53 is parallel to the width direction of the groove R. Thus, when a plurality of luminous flux control members 50 are to be passed through the rail having the groove R, the luminous flux control members 50 are oriented in the direction as shown in FIG. 6A and can pass through the rail. That is, by causing the luminous flux control members 50 to pass through the rail, the orientation of all of the luminous flux control members 50 can be aligned.

The size of the isosceles triangle configured by the legs 53 in the luminous flux control member 50 and the width of the groove R in the rail can be set based on either of them, for example. For example, by setting the size and placement of the former in advance, the width of the latter can be set, or by setting the width of the latter in advance, the size and placement of the former can be set.

The width of the groove R can be set according to, for example, the length of the base of the isosceles triangle configured by the legs 53 and the length of the two equal sides. The width of the groove R is, for example, more than the length of the base of the isosceles triangle and is less than the length of two equal sides.

In the luminous flux control member 50 according to the present embodiment, if the orientation of the groove R shown in FIG. 6A with respect to the axis changes, the legs 53 of the luminous flux control member 50 are not fit in the groove R. For example, when the luminous flux control member 50 shown in FIG. 6A is rotated to be oriented in the direction as shown in FIG. 6B, the length of the two equal sides of the isosceles triangle configured by the legs 53 becomes larger than the width of the groove R, and all of the legs 53 thus cannot be accommodated in the groove. In this manner, the luminous flux control member 50 can pass through the groove R only in a predetermined direction.

Embodiment 2B

Figure 7A:
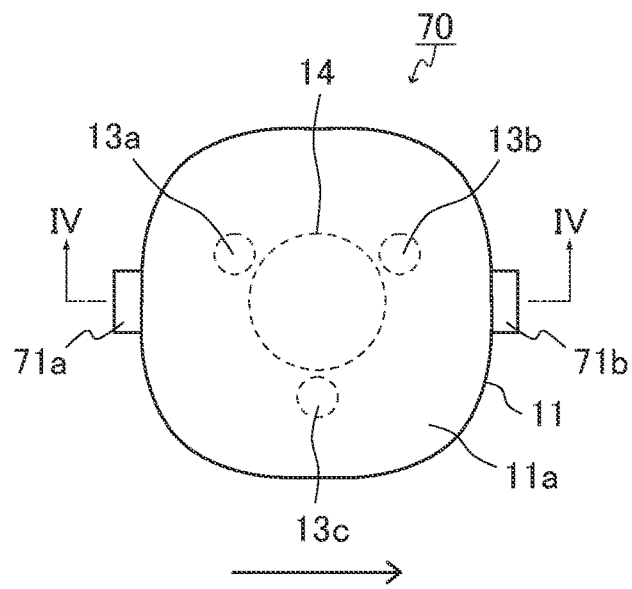
FIG. 7A is a top view of a luminous flux control member 70 according to an embodiment 2B.
Figure 7B:
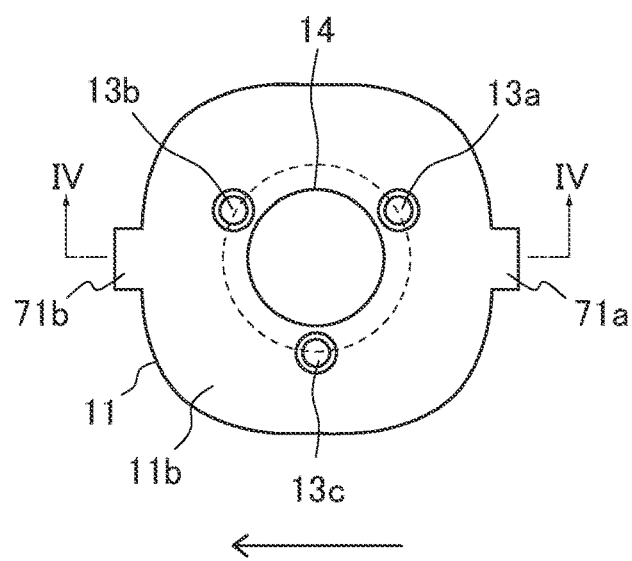
FIG. 7B is a bottom view of the luminous flux control member 70.
Figure 7C:
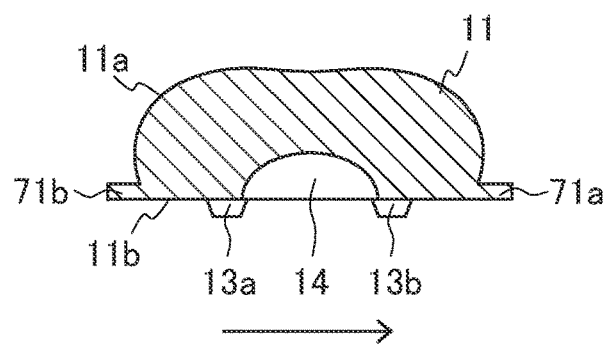
FIG. 7C is a cross-sectional view of the luminous flux control member 70 viewed from the IV-IV direction of FIGS. 7A and 7B.

FIGS. 7A to 7C show another example of the second luminous flux control member. FIG. 7A is a plan view of the luminous flux control member 70 viewed from above. FIG. 7B is a plan view of the luminous flux control member 70 viewed from below. FIG. 7C is a cross-sectional view of the luminous flux control member 70 viewed from the IV-IV direction of FIGS. 7A and 7B.

The luminous flux control member 70 according to the present embodiment is the same as that of the embodiment 1A except that the lens main body 11 does not include downward projections 15 but includes radial projections 71a and 71b projecting outward in the radial direction.

FIGS. 7A to 7C show an aspect including two radial projections 71a and 71b. However, the number of the radial projections may be, for example, one or two or more. In the case of including two or more radial projections, it is preferable that the radial projections 71a and 71b are disposed on the respective side surfaces to be paired on a diagonal line of the lens main body 11 as shown in FIGS. 7A to 7C, for example.

The radial projections 71a and 71b are disposed outward from the side surface of the lens main body 11. The size of the radial projections 71a and 71b are not particularly limited, and the shape thereof may be any shape as long as the length of the straight line passing through the radial projections 71a and 71b and the center of the lens main body 11 is longer than the other straight lines passing through the center on the outer periphery of the lens main body 11.

Figure 8A:
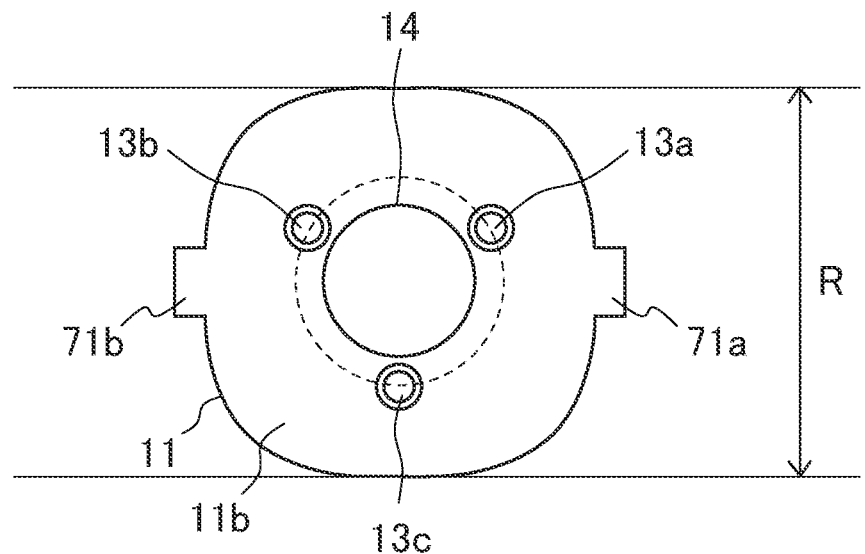
FIGS. 8A and 8B are schematic views showing a relationship between the luminous flux control member 70 and a groove in the embodiment 2B.
Figure 8B:
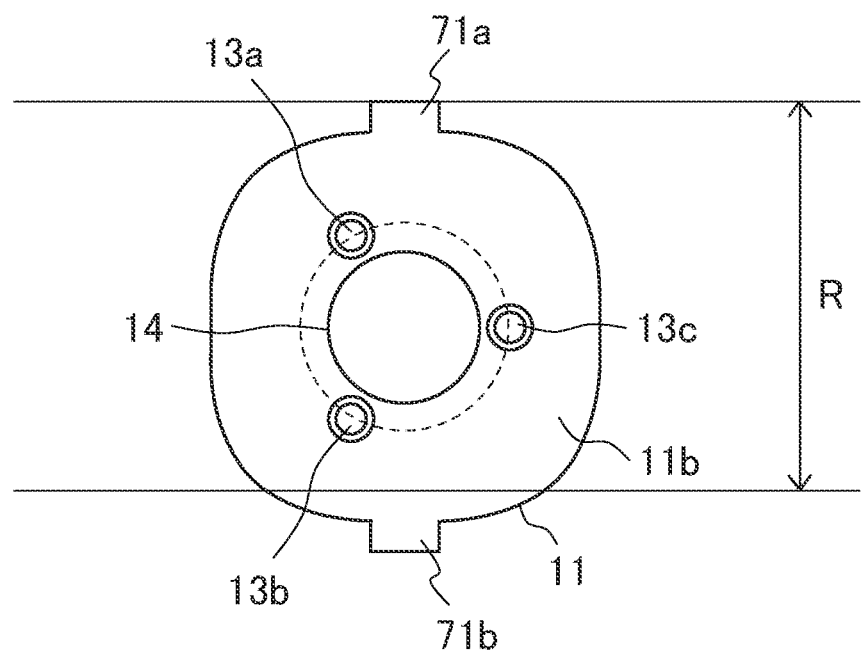

Next, FIGS. 8A and 8B schematically show the relationship between the luminous flux control member 80 and a groove. FIGS. 8A and 8B are plan views of the luminous flux control member 80 viewed from below as in FIG. 7B.

As shown in FIG. 8A, when the luminous flux control member 70 has, on the side surface of the lens main body 11, radial projections 71*a* and 71*b* projecting outward in the radial direction, the luminous flux control member 70 can be controlled to be accommodated in the groove R only in the case where the luminous flux control member 70 is oriented in a predetermined direction. Specifically, as shown FIG. 8A, the luminous flux control member 70 is designed such that the luminous flux control member 70 is accommodated in the groove R in the state where the projecting direction of the radial projections 71*a* and 71*b* is perpendicular to the width direction of the groove R. Thus, when a plurality of luminous flux control members 70 are to be passed through the rail having the groove R, the luminous flux control members 70 are oriented in a direction as shown in FIG. 8A and can pass through the rail. That is, by causing the luminous flux control members 70 to pass through the rail, the orientation of all of the luminous flux control members 70 can be aligned.

The size of the radial projections 71*a* and 71*b* in the luminous flux control member 70 and the width of the groove in the rail can be set based on any of them, for example. For example, by setting the size and placement of the former in advance, the width of the latter can be set, or by setting the width of the latter in advance, the sizes and placement of the former can be set.

In the luminous flux control member 70, the length (i) of the line connecting between the radial projections 71*a* and 71*b* is designed to be longer than the length (j) of the side perpendicular thereto. The width of the groove R can be set according to, for example, the length (i) of the projecting side of the radial projections 71*a* and 71*b* or a length (length of the projecting side) connecting between the radial projections 71*a* and 71*b*. The width of the groove R is, for example, more than the length (j) of the perpendicular side and less than the length (i) of the line connecting between the radial projections 71*a* and 71*b*.

In the luminous flux control member 70 according to the present embodiment, if the orientation of the groove R shown in FIG. 8A with respect to the axis changes, the luminous flux control member 70 is not accommodated in the groove R. For example, when the luminous flux control member 70 shown in FIG. 8A is rotated to be oriented in the direction as shown in FIG. 8B, the width of the luminous flux control member 70 becomes longer than that of the groove R, and the luminous flux control member 70 thus cannot be accommodated in the groove. In this manner, the luminous flux control member 70 can pass through the groove R only in a predetermined direction.

Embodiment 2C

Figure 13A:
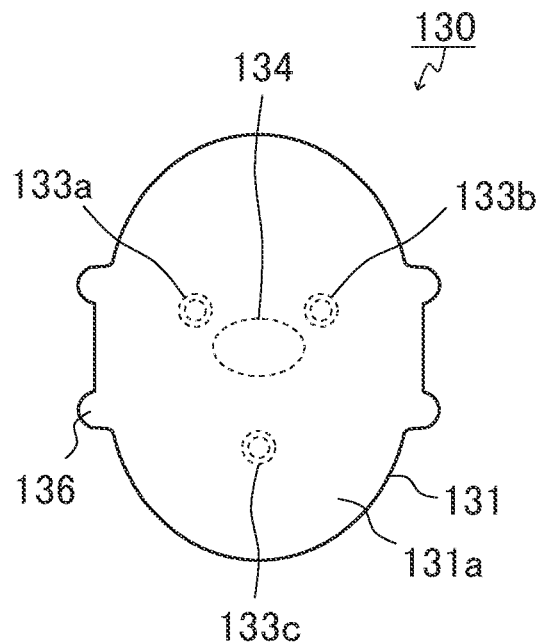
FIG. 13A is a top view of a luminous flux control member 130 according to an embodiment 2C.
Figure 13B:
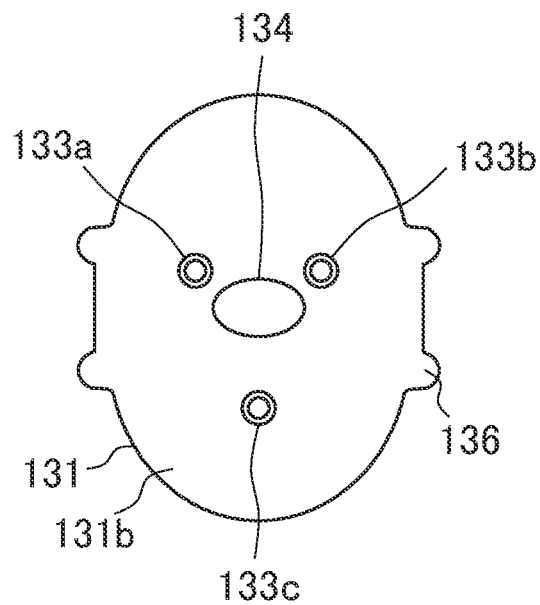
FIG. 13B is a bottom view of the luminous flux control member 130.

FIGS. 13A and 13B show another example of the second luminous flux control member. FIG. 13A is a plan view of the luminous flux control member 130 viewed from above. FIG. 13B is a plan view of the luminous flux control member 130 viewed from below. In FIGS. 13A and 13B, legs 133 (133*a*, 133*b*, 133*c*) have the same shape and placement as the legs 53 (53*a*, 53*b*, 53*c*) in FIGS. 5A to 5C, respectively.

The luminous flux control member 130 according to the present embodiment is the same as that of the embodiment 2A except that a lens main body 131 has an elliptic shape, a depression 134 for covering the LED on the lower surface 131*b* of the lens main body 131 has an elliptic shape, and side projections 136 are present at four places.

Figure 14A:
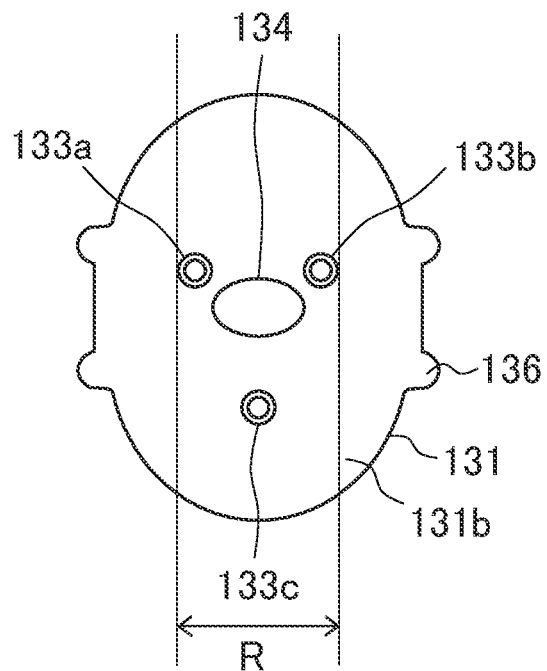
FIGS. 14A and 14B are schematic views showing a relationship between the luminous flux control member 130 and a groove in the embodiment 2C.
Figure 14B:
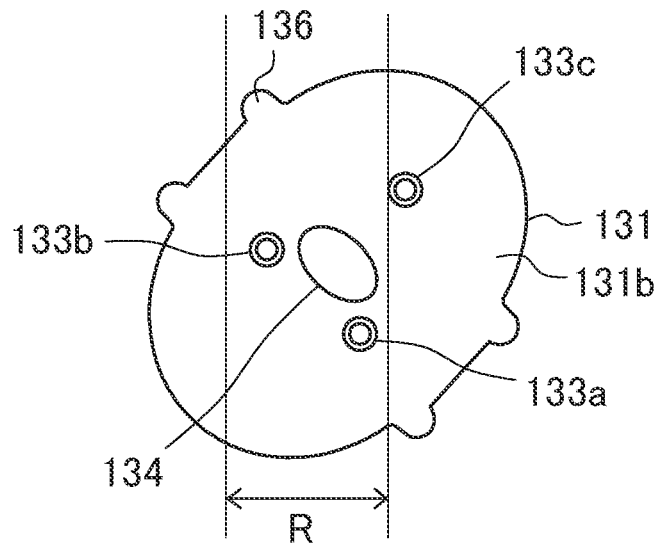

Next, FIGS. 14A and 14B schematically show the relationship between the luminous flux control member 130 and a groove. FIGS. 14A and 14B are plan views of the luminous flux control member 130 viewed from below as in FIG. 13B.

As shown in FIGS. 14A and 14B, the luminous flux control member 130 can pass through the groove R only in a predetermined direction as in the embodiment 2A.

Embodiment 2D

Another example of the second luminous flux control member is shown below. The luminous flux control member according to the present embodiment is the same as that of FIGS. 9A and 9B in the embodiment 1C.

When the luminous flux control member 90 includes four side projections 4 projecting outward in a radial direction on the side surface of the lens main body 91, a tangent line to each of two adjacent side projections 96 can be drawn, i.e., two tangent lines can be drawn. Thus, when a groove R having a width between the two tangent lines is formed, the luminous flux control member 90 can be controlled to be accommodated in the groove R only in the case where the luminous flux control member 90 is oriented in a predetermined direction. Specifically, as shown in FIG. 15A, the luminous flux control member 90 is designed such that the luminous flux control member 90 is accommodated in the groove R in the state where the projecting direction of the side projections 96 (96*a*, 96*b*, 96*c*, 96*d*) is perpendicular to the width direction of the groove R.

Figure 15A:
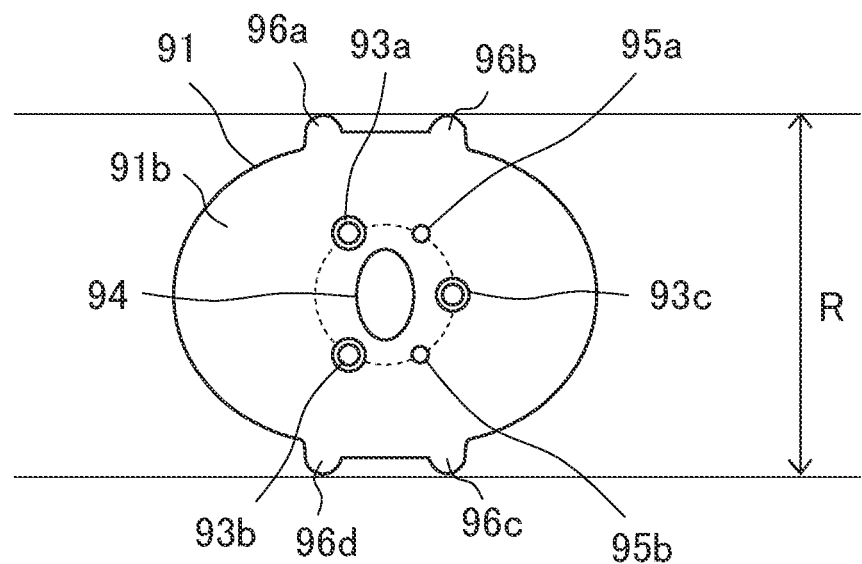
FIGS. 15A and 15B are schematic views showing a relationship between a luminous flux control member 150 and a groove in the embodiment 2D.
Figure 15B:
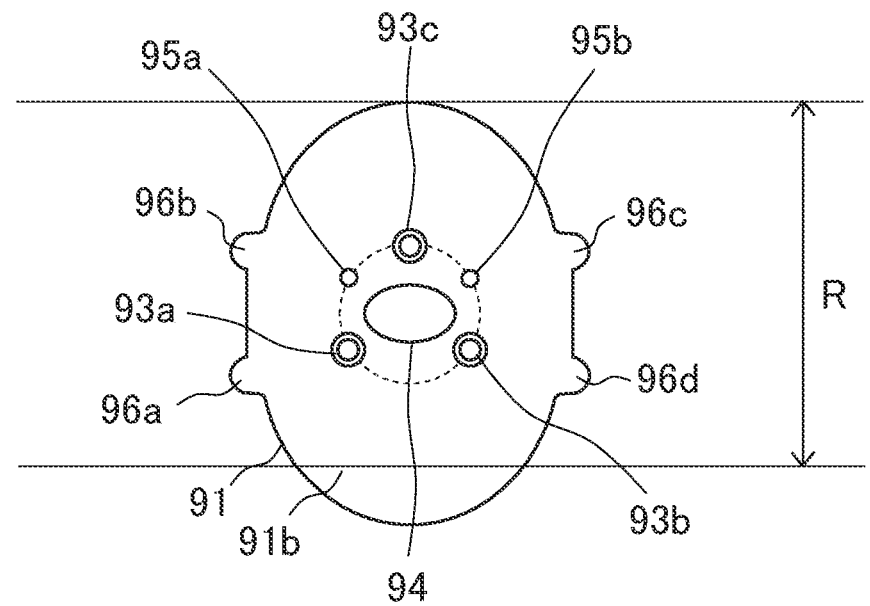

Next, FIGS. 15A and 15B schematically show the relationship between the luminous flux control member 90 and a groove. FIGS. 15A and 15B are plan views of the luminous flux control member 90 viewed from below as in FIG. 9B. As shown in FIGS. 15A and 15B, the luminous flux control member 90 can pass through the groove R only in a predetermined direction as in the embodiment 2B.

(Light-Emitting Device)

As mentioned above, the light-emitting device according to the present invention includes: a substrate, light-emitting elements, and the luminous flux control member, the light-emitting elements are mounted on the substrate, the luminous flux control member is mounted so as to cover the light-emitting elements, and the luminous flux control member is the luminous flux control member according to the present invention.

The point of the light-emitting device according to the present invention is using the luminous flux control member according to the present invention, and the other configurations and conditions are not at all limited. The light-emitting device according to the present invention can also be referred to as an optical element substrate for a backlight, for example.

The luminous flux control member according to the present invention to be used in the light-emitting device according to the present invention can control the orientation thereof as mentioned above. Therefore, in the light-emitting device according to the present invention, the luminous flux control member disposed on the substrate can be mounted so as to orient in a desired direction.

(Method for Producing Light-Emitting Device)

As mentioned above, the method for producing a light-emitting device according to the present invention includes: an aligning step of aligning orientation of luminous flux control members by passing through at least one rail having a groove; and a mounting step of moving the luminous flux control members aligned by passing through the at least one rail on a light-emitting element-mounted substrate while maintaining the aligned orientation so as to cover the light-emitting element, the luminous flux control members are the luminous flux control members according to the present invention, and the aligning step satisfies the following condition 1' or 2': (Condition 1') the at least one rail includes two rails, grooves of the two rails have different widths, and at least one of the legs is accommodated in one of the grooves, and the other legs are accommodated in the other groove only when lens main bodies of the luminous flux control members are oriented in predetermined one direction or the opposite direction; and (Condition 2') the at least one rail includes one rail, the lens main body or all of the legs are accommodated in the groove only when lens main bodies of the luminous flux control members are oriented in predetermined one direction or the opposite direction.

The point of the method for producing a light-emitting device according to the present invention is using the luminous flux control member according to the present invention, and the other configuration and conditions are not at all limited. The method for producing a light-emitting device according to the present invention can also be referred to as, for example, a method of producing an LED substrate for a backlight.

The luminous flux control member according to the present invention to be used in the method for producing a light-emitting device according to the present invention can control the orientation thereof as mentioned above. Thus, when the orientations of a plurality of the luminous flux control members are aligned by passing through the rail(s) in the aligning step, the luminous flux control members can be controlled to be oriented in one direction. Therefore, for example, in the case where the orientations of the luminous flux control members are required to be constant, such as the case of an anisotropic lens, the method for producing a light-emitting device according to the present invention can easily control the orientations.

The method for producing a light-emitting device according to the present invention includes a first production method satisfying the condition 1' and a second production method satisfying the condition 2', the first luminous flux control member according to the present invention can be used in the first production method, and the second luminous flux control member according to the present invention can be used in the second production method. The method for producing a light-emitting device according to the present invention can be described with reference to the description of the luminous flux control member according to the present invention.

Although the present invention has been described above with reference to the embodiments, the present invention is not limited to the above-described embodiments. Various modifications can be made to the structure and details of the present invention which can be understood by a person skilled in the art within the scope of the present invention.

This application claims priority from and the benefit of Japanese Patent Application No. 2017-063376, filed on Mar. 28, 2017, the entire disclosure of which is incorporated herein by reference.

INDUSTRIAL APPLICABILITY

As described above, the luminous flux control member according to the present invention satisfies the condition 1 or 2. Thus, for example, the luminous flux control member can be controlled to be oriented in a predetermined direction by passing through a rail(s) having the corresponding groove(s). Therefore, for example, in production of the light-emitting device which is a component of a backlight, the luminous flux control member can be mounted on an LED substrate in the state where the luminous flux control member is oriented in a predetermined direction.

REFERENCE SIGNS LIST

10, 30, 50, 70, 90, 110, 130: luminous flux control member
11, 91, 111, 131: lens main body
13, 33, 53, 93, 113, 133: leg
14, 94, 114, 134: depression
15, 95: downward projection
71: radial projection
16: gate
96, 116, 136: side projection

The invention claimed is:

1. A luminous flux control member comprising:
    a lens main body; and
    legs, wherein
    the lens main body comprises: a light-entering area for light emitted from a light-emitting element to enter on a lower surface side; and a light-emitting area for emitting the light entered from the light-entering area to emit on an upper surface side, and
    the legs are legs for mounting the luminous flux control member on a substrate on which the light-emitting element is mounted and are disposed on a lower surface of the lens main body so as to project downward, and
    the luminous flux control member satisfies the following condition 1 or 2:
    (Condition 1) at least one of the legs is accommodated in one of two grooves having different widths, and all of the other legs are accommodated in the other groove only when the lens main body is oriented in one predetermined direction or an opposite direction thereto; and
    (Condition 2) the lens main body or all of the legs are accommodated in one groove only when the lens main body is oriented in one predetermined direction or an opposite direction thereto.

2. The luminous flux control member according to claim 1, further comprising:
    at least one downward projection projecting downwardly, wherein
    the at least one downward projection is disposed on a lower surface side of the lens main body, and
    the luminous flux control member satisfies the condition 1.

3. The luminous flux control member according to claim 2, wherein the number of the legs is three or more.

4. The luminous flux control member according to claim 2, wherein
    the legs are disposed at equal intervals on the same circumference of a circle centered on the center of a lower surface side of the lens main body, and
    the at least one downward projection is disposed on the same circumference.

5. The luminous flux control member according to claim 4, wherein
    the number of the legs is three,
    the at least one downward projection comprises two downward projections, and
    one of the downward projections is disposed between adjacent legs.

6. The luminous flux control member according to claim 1, wherein
at least one of the legs has an elliptical cross section, and the other legs each has a circular cross section, and
the luminous flux control member satisfies the condition 1.

7. The luminous flux control member according to claim 6, wherein the number of the legs is three of more.

8. The luminous flux control member according to claim 6, wherein
the legs are disposed at equal intervals on the same circumference of a circle centered on the center of a lower surface side of the lens main body.

9. The luminous flux control member according to claim 6, wherein
the number of the elliptical legs is two,
the number of the circular legs is one,
each of the two elliptical legs has a diameter in a lateral direction that is the same as that of the circular leg, and
longitudinal sides of the elliptical legs are parallel to each other.

10. The luminous flux control member according to claim 1, wherein
the number of the legs is three, and
the legs are disposed to be vertexes of an isosceles triangle on the lower surface side of the lens main body, and
the luminous flux control member satisfies the condition 2.

11. The luminous flux control member according to claim 1, further comprising:
at least one radial projection projecting outward in a radial direction, wherein
the at least one radial projection is disposed outward from a side surface of the lens main body, and
the luminous flux control member satisfies the condition 2.

12. The luminous flux control member according to claim 11, wherein the number of the legs is three or more.

13. The luminous flux control member according to claim 11, wherein
the at least one radial projection comprises a pair of radial projections,
one of the radial projections is disposed at any site on a side surface of the lens main body, and
the other radial projection is disposed at a site on the side surface opposite across the center line of the lens main body from the any site.

14. A light emitting device, comprising:
a substrate;
at least one light-emitting element; and
a luminous flux control member, wherein
the at least one light-emitting element comprises light-emitting elements,
the light-emitting elements are mounted on the substrate,
the luminous flux control member is mounted so at to cover the light-emitting elements, and
the luminous flux control member is the luminous flux control member according to claim 1.

15. A method for producing a light-emitting device, comprising:
an aligning step of aligning an orientation of luminous flux control members by passing through at least one rail having a groove; and
a mounting step of moving the luminous flux control members aligned by passing through the at least one rail on a light-emitting element-mounted substrate while maintaining the aligned orientation so as to cover a light-emitting element, wherein
the luminous flux control members are the luminous flux control members according to claim 1, and
the aligning step satisfies the following condition 1' or 2':
(Condition 1') at least one rail comprises two rails, grooves of the two rails have different widths, and at least one of the legs is accommodated in one of the grooves, and the other legs are accommodated in the other groove only when lens main bodies of the luminous flux control members are oriented in predetermined one direction or the opposite direction; and
(Condition 2') the at least one rail comprises one rail, the lens main body or all of the legs are accommodated in the groove only when lens main bodies of the luminous flux control members are oriented in predetermined one direction or the opposite direction.

16. The method according to claim 15, wherein
the aligning step satisfies the condition 1', and
the luminous flux control members are the luminous flux control members comprising:
at least one downward projection projecting downwardly, wherein
the at least one downward projection is disposed on a lower surface side of the lens main body, and
the luminous flux control member satisfies the condition 1.

17. The method according to claim 15, wherein
the aligning step satisfies the condition 2', and
the luminous flux control members are the luminous flux control members wherein
the number of the legs is three, and
the legs are disposed to be vertexes of an isosceles triangle on the lower surface side of the lens main body, and
the luminous flux control member satisfies the condition 2.

* * * * *